(12) United States Patent
Busopulos

(10) Patent No.: US 6,184,492 B1
(45) Date of Patent: Feb. 6, 2001

(54) WELDING ELECTRODE HOLDER FOR COATED ELECTRODES

(76) Inventor: Nikolaos Busopulos, 34 Dragatsaniou Street, Piraeus 185 45 (GR)

(*) Notice: Under 35 U.S.C. 154(b), the term of this patent shall be extended for 0 days.

(21) Appl. No.: 09/155,179

(22) Filed: Jul. 19, 1999

(30) Foreign Application Priority Data

Jul. 16, 1996 (GR) .............................................. 960100246
May 26, 1997 (WO) ................... PCT/GR97/00016

(51) Int. Cl.7 .............................. B23K 9/28; B23K 9/29
(52) U.S. Cl. ............................................. 219/138; 219/70
(58) Field of Search .............................. 219/138, 70, 130

(56) References Cited

U.S. PATENT DOCUMENTS

| | | | |
|---|---|---|---|
| 3,140,386 | * | 7/1964 | Cartright ............................. 219/138 |
| 3,654,421 | * | 4/1972 | Streetman et al. ..................... 219/70 |
| 4,761,531 | * | 8/1988 | Moss ...................................... 219/70 |

* cited by examiner

Primary Examiner—Patrick Ryan
Assistant Examiner—Anjan Dey

(57) ABSTRACT

Welding electrode holder comprising an electrically conducting body with positioning seats of electrodes and welding cable connection position, an insulating tubular handle where the back part of the body is encaged, a lever pivotably assembled with the body and having insulated lever arm, a compression spring seated on the electrode holder body or on the handle and pushing the lever arm thus forcing the lever to be turned and to exert force onto the positioning seats of electrodes, and an insulating head covering the parts of the body and those of the lever located in front of the handle or even covering and part of the handle and allowing the clamping of electrodes on the body. It is characterized in that the welding cable connection position is located outside the handle and inside the insulating head, behind or/and underneath the positioning seats of electrodes, and in that the rest electrode holder body, i.e. behind the welding cable connection position, is encaged in a separate receptacle located above the longitudinal though hole of the handle and outside or inside the insulating head. It is used for manual metal arc welding with coated electrodes, it develops low temperature on the external surface of the handle held by the welder and moreover it has low weight.

6 Claims, 2 Drawing Sheets

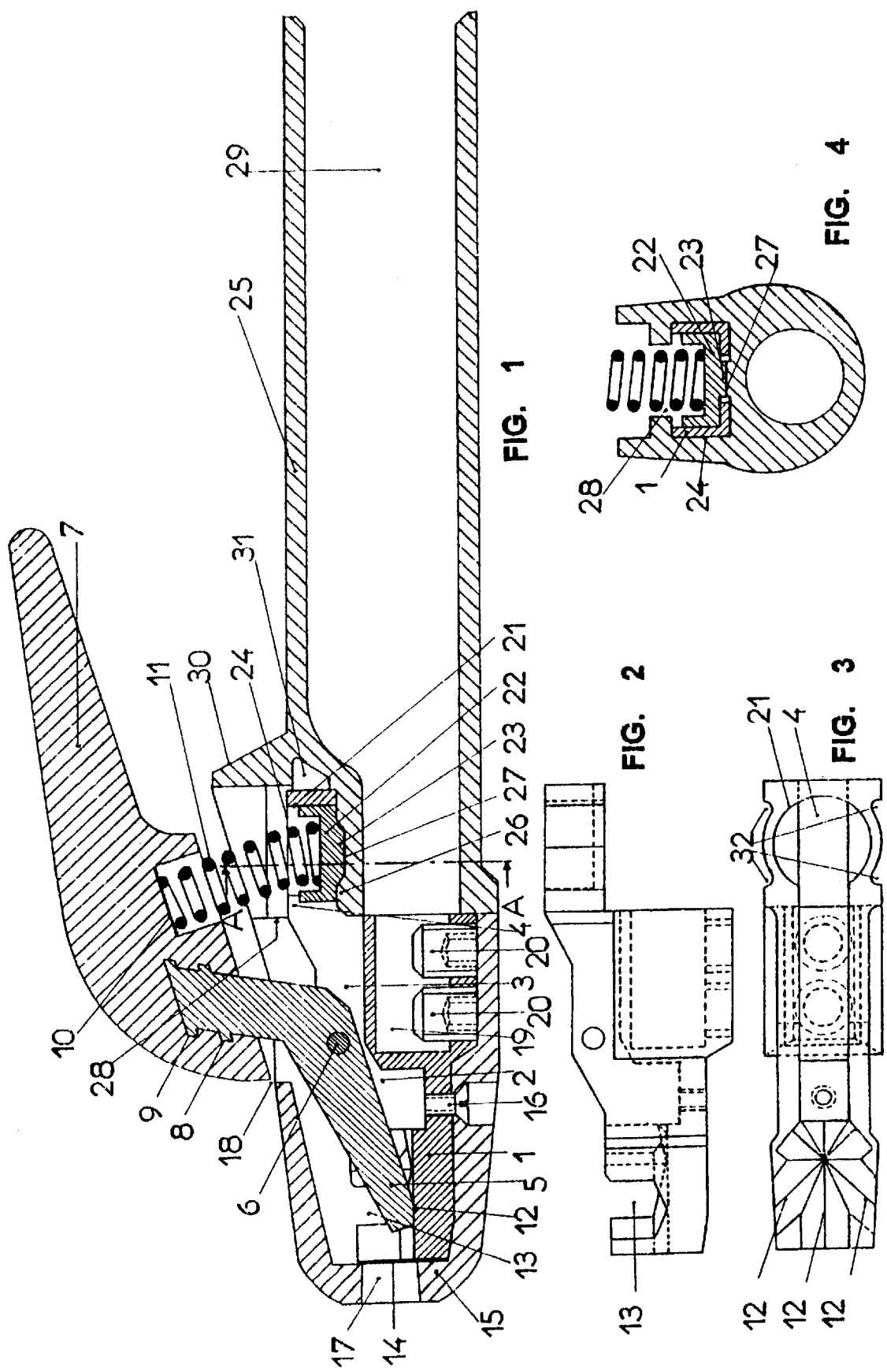

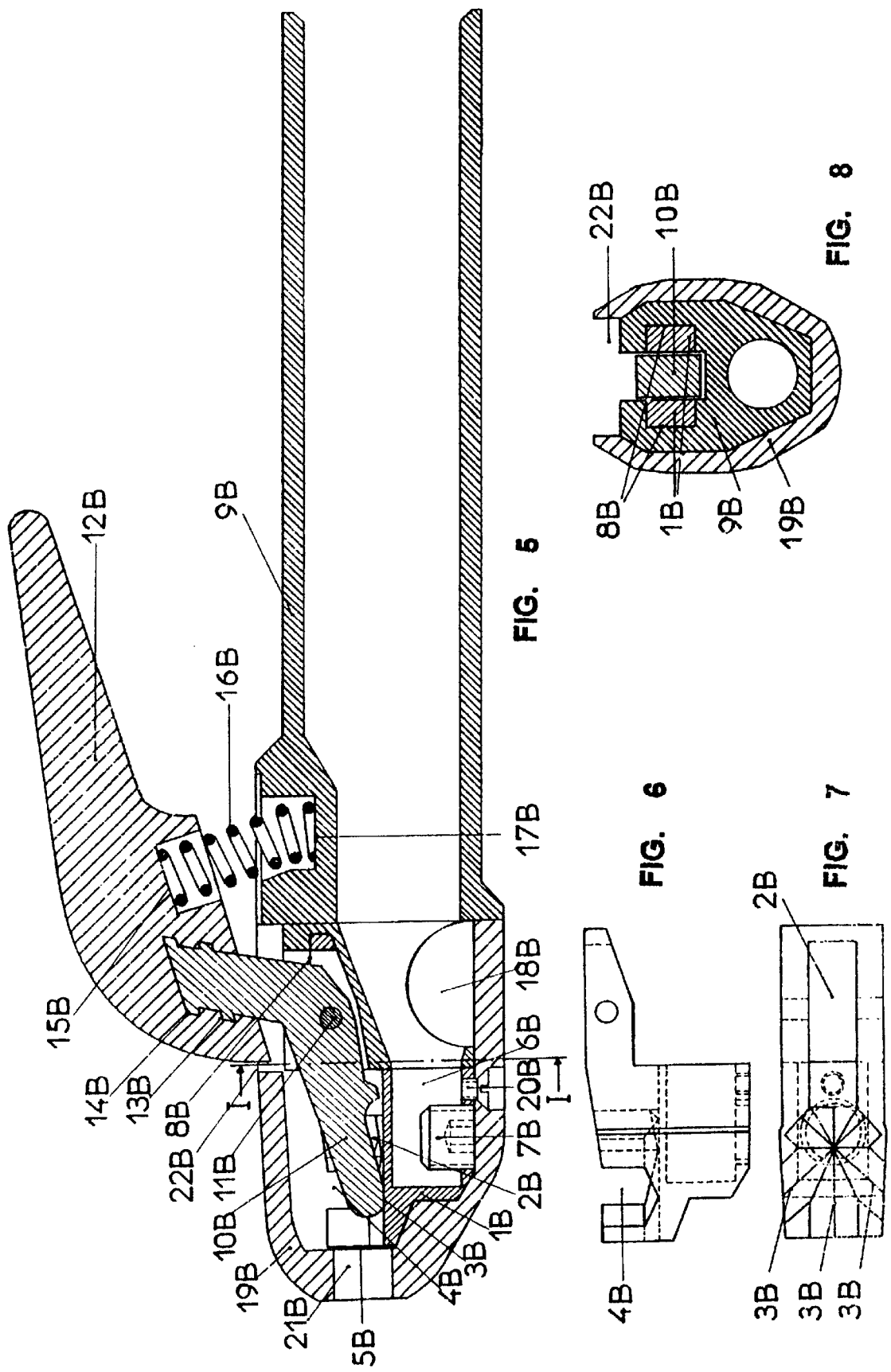

WELDING ELECTRODE HOLDER FOR COATED ELECTRODES

The invention relates to a welding electrode holder for coated electrodes comprising an electrically conducting electrode holder body with positioning seats of electrodes and welding cable connection position, an electrically and thermally insulating handle of tubular shape where the back part of the electrode holder body is encaged, a lever pivotably assembled with the electrode holder body and having the lever arm electrically—thermally insulated, a compression spring seated on the electrode holder body or on the handle and pushing the lever arm thus forcing the lever to be turned and to exert force onto the positioning seats of electrodes, and an electrically—thermally insulating head covering the parts of the electrode holder body and those of the lever located in front of the handle or even covering and part of the handle and allowing the clamping of electrodes onto the electrode holder body.

Welding electrode holders for coated electrodes are known in several designers with differences focused mainly in the clamping mechanism of electrodes, in the geometry and the orientation of the positioning seat or seats of electrodes, in the connection of the welding cable to the electrode holder body and in the assembly of the insulating parts with the electrically conducting parts.

Common feature of the known electrode holders for coated electrodes is that the part of the electrode holder body with the welding cable connection position is located inside the handle and it is in contact with the inside wall of the longitudinal through hole of the handle.

The conduction of electric current from the welding cable to the electrode, through the electrode holder body, generates inevitably heat in the electrode holder body. The heat is generated due to the contact resistance between the bare end of the welding cable and the electrode holder body at the welding cable connection position, due to the electric resistance of the electrode holder body, and due to the contact resistance between the positioning seats of electrodes at the electrode holder body and the electrode.

A part of this heat is transferred from that section of the electrode holder body located inside the longitudinal through hole of the handle onto the inside wall of the handle and from there to the external surface of the handle which is held by the welder.

If the temperature on the external surface of the handle rises at a high value, it is not easy for the welder to hold and to manipulate the electrode holder. Overheating of the electrode holder not only makes it uncomfortable for the welder, but it can also cause excessive voltage drop in the welding circuit. Therefore, it can impair the performance of the welder and reduce the quality of the welds.

According to the standard DIN 8569 Part 1: 1974—Rod Electrode Holders for Metal Arc Welding—"the temperature of the rod electrode holder in the area held by the hand above the welding cable connection may exceed the ambient temperature by not more than 40 K". This standard has been replaced by DIN EN 60974-11: 1996—Electrode holders—which states that "the temperature rise caused by the rated current passing through the electrode holder, . . . , shall not exceed 40 K at the hottest spot of the external surface of the handle".

If the welding current, required for welding a size (diameter) of electrode, causes overheating of the electrode holder, it is necessary the electrode holder to be replaced by a bigger one. The bigger size electrode holder has a bigger body with bigger cross section in particular, resulting in reduction of the electric resistance. Consequently, the generated heat is reduced in relation to the heat generated in a smaller size (cross section) electrode holder body during the same time interval and by the same electric current intensity.

On the other hand, increasing the size of the electrode holder its weight is increased too, resulting in sooner fatigue of the welder's hand and rendering the electrode holder less comfortable and more awkward to use.

The invention as described herein aims at the reduction of the temperature developed on the external surface of the handle held by the welder and moreover at the reduction of the electrode holder weight in relation to the known electrode holders, for the same welding current intensity and for the same duty cycle.

The solution is achieved by transferring the welding cable connection position outside the handle and inside the insulating head of the electrode holder, behind or/and underneath the positioning seats of electrodes and by encaging the back part of the electrode holder body, i.e. the part behind the welding cable connection position, in a seperate receptacle located at the front part of the handle, above the longitudinal through hole of the handle and outside or inside the insulating head.

The transfer of the welding cable connection position outside the handle and behind or/and underneath the positioning seats of electrodes, i.e. its transfer closer to the positioning seats of electrodes, shortens the distance travelled by the welding current in the electrode holder body. A result of this is the reduction of the generated heat in relation to the heat generated in an electrode holder body of the same cross section, having the welding cable connected at the rear end of the electrode holder body, i.e. further from the positioning seats of electrodes.

Moreover, the weight of the electrode holder is reduced mainly due to the shorter length of the electrode holder body.

Furthermore, the transfer of the welding cable connection position outside the handle keeps the heat generating parts of the electrode holder body away from the hand of the welder. A result of this is the reduction of the temperature on the surface of the handle held by the welder in relation to the temperature developed at the same surface, when the welding cable connection position is located inside the handle and underneath the surface held by the welder.

The rest part of the electrode holder body, being inserted into a separate receptacle at the front part of the handle, is kept away from the surface of the handle held by the welder and in particular away from the downward part of this surface, due to the intervention of the longitudinal through hole of the handle. The hand of the welder can be kept further away from the back part of the electrode holder body, which is inserted in the separate receptacle of the handle, by one way of materialization of the invention, in which the front part of the handle with the separate receptacle is extended inside the insulating head and the whole electrode holder body is covered by the insulating head.

The lower temperature on the external surface of the handle held by the welder in relation to the temperature on the corresponding surface of the handle of the known electrode holders, when the electrode holder body is of the same cross section, as well as the lower weight of the electrode holder, provide more comfortable working conditions to the welder. Consequently, the work efficiency is increased.

The invention is hereinafter described by two ways of materialization, as examples, without these examples to restrict the possible ways of its materialization. The differences between these two ways are focused mainly in the location of the welding cable connection position in relation to the positioning seats of electrodes and also in the assemblage of the electrode holder body with the handle.

The FIG. 1 is a longitudinal section of the welding electrode holder, according to the first way of materialization of the invention.

The FIG. 2 is a longitudinal side view of the electrode holder body only, according to the first way of materialization of the invention.

The FIG. 3 is a longitudinal view from the top of the electrode holder body only, according to the first way of materialization of the invention.

The FIG. 4 is a cross section at the line A—A of the FIG. 1.

The FIG. 5 is a longitudinal section of the welding electrode holder, according to the second way of materialization of the invention.

The FIG. 6 is a longitudinal side view of the electrode holder body only, according to the second way of materialization of the invention.

The FIG. 7 is a longitudinal view from the top of the electrode holder body only, according to the second way of materialization of the invention.

The FIG. 8 is a cross section at the line I—I of the FIG. 5.

Referring to the first way of materialization of the invention, as it is shown in the FIGS. 1, 2, 3 and 4, the welding electrode holder comprises an electrically conducting electrode holder body (1) made of a copper alloy. At the front part of the electrode holder body (1) there is a longitudinal channel (2) which is continued to a longitudinal channel (3) in the middle part of the electrode holder body (1) and it ends to a longitudinal channel (slot) (4) in the back part of the electrode holder body (1). A flat metallic lever (5) is placed in the longitudinal channel (2) and (3).

A metallic pin (6) is inserted into a transverse through hole on both sides of the electrode holder body (1) and into a transverse through hole on the metallic lever (5). Therefore, the pin (6) holds the electrode holder body (1) assembled with the metallic lever (5) and allows only the pivoting of the metallic lever (5) with pivoting axis the pin (6).

The back part of the metallic lever (5) is solidly encased in an electrically—thermally insulating material, e.g. bakelite, from which said material it is made the lever arm (7) The connection of the metallic lever (5) with the lever arm (7) is achieved by the protrusions (8) and (9) at the back part of the metallic lever (5), said protrusions being solidly encased in the the electrically—thermally insulating material. The metallic lever (5) and the lever arm (7) form a single component which is the lever of the welding electrode holder.

The lever arm(7) has a hole (10) in which hole (10) it is seated the one end of a compression spring (11).

The front part of the metallic lever (5) is terminating at the front part of the electrode holder body (1) onto the positioning seats of electrodes (12). The positioning seats of electrodes (12) are formed by the front part of the longitudinal channel (2) and by two electrode insertion openings (13), one opening at each side of the electrode holder body. The front part of the channel (2) terminates to an open end (14) for insertion of electrodes, said open end (14) being at the same height with the openings (13).

The front and the middle part of the electrode holder body (1), as well as the part of the metallic lever (5) not encased in the electrically—thermally insulating material of the lever arm (7), are covered by an insulating head (15) made of electrically—thermally insulating material, e.g. bakelite. The insulating lead (15) is fixed on the electrode holder body (1) by a screw (16).

The insulating head (15) has two side openings facing the two electrode insertion openings (13) and one electrode insertion hole (17), said hole (17) being at the same height with the open end (14) for insertion of electrodes in the electrode holder body (1). Furthermore, the insulating head (15) has a recess (18) into which the lever of the electrode holder can move freely during its pivoting.

The electrode holder body (1) has a longitudinal hole (19) located at its middle part for the reception of the bare end of the welding cable. At the downward part of the wall of the hole (19) there are two screws (20) directed inside the hole (19). Instead of the two screws (20) there can be one screw (20) only. The hole (19) and the screw(s) (20) form the welding cable connection position in the electrode holder body (1).

At the back part of the electrode holder body (1) there is a circular cross section cavity (21) which is traversed by the longitudinal channel (slot) (4). The diameter of the cavity (21) is bigger than the width of the channel (slot) (4). The bottom of the channel (slot) (4) is through (open) in contrast to the bottom of the longitudinal channel (2) and also to the bottom of the longitudinal channel (3) which are not through.

On that part of the bottom of the cavity (21), which is left out from each side of the channel (slot) (4), it is seated a solid spring base (22), said spring base (22) being made of electrically—thermally insulating material, e.g. bakelite. At the lower part of the spring base (22) there is a protrusion (23) whose height is smaller than the wall thickness of the bottom of the cavity (21) in the electrode holder body (1). The one end of the compression spring (11) is seated on the spring base (22) and its other end is seated in the hole (10) of the lever arm (7). The compression spring (11) is always under compression between the spring base (22) and the bottom of the hole (10).

The back part of the electrode holder body (1) is inserted like a drawer into a separate receptacle (24) located at the front part of the handle (25) of the electrode holder. The handle (25) is made of electrically—thermally insulating material, e.g. bakelite.

At the bottom of the separate receptacle (24) there is a longitudinal protrusion (26) whose width is smaller than the width of the longitudinal channel (slot) (4) and whose height is equal or slightly smaller than the wall thickness of the bottom of the cavity (21) in the electrode holder body (1). On the longitudinal protrusion (26) there is a recess (27) in which recess (27) it is seated the protrusion (23) of the spring base (22).

The top part of the separate receptacle (24) has a longitudinal opening (28) spanning from the front edge and along the whole length of the separate receptacle (24). The width of the longitudinal opening (28) is smaller than the width of the back part of the electrode holder body (1) and bigger than the diameter of the compression spring (11) so that the back part of the electrode holder body (1) can only be inserted into the separate receptacle (24) like a drawer and the compression spring (11) can pass freely through the longitudinal opening (28).

The handle (25) has a longitudinal through hole (29) so that the welding cable can be inserted freely into the handle (25).

In order for the bare end of the welding cable to be connected in the electrode holder body, the handle (25) has to be removed first.

In order for the handle (25) to be removed, the front part of the electrode holder is grabbed by the one hand at the insulating head (15) or at the lever arm (7) whereas the handle (25) is grabbed by the other hand and a sudden pull force is exerted along the horizontal axis of the electrode holder.

Alternatively, the handle (25) can be grabbed by one hand and the electrode holder to be moved so that the back end of the lever arm (7) to be hammered onto an object with direction of movement parallel to the horizontal axis of the electrode holder.

The back part of the electrode holder body (1) is disencaged from the handle (25) due to the tensional force exerted along the horizontal axis of the electrode holder between the front part of the electrode holder and the handle (25). The protrusion (23) of the spring base (22) is forced to ascent from the recess (27) and to slide on the longitudinal protrusion (26) at the bottom of the separate receptacle (24) of the handle (25), overcoming the vertical force of the compression spring (11) on the spring base (22).

The compression spring (11) is performing two operations. It exerts the force, through the lever, for the clamping of the welding electrodes on the positioning seats of electrodes (12) at the front part of the electrode holder body (1), and it also holds assembled the handle (25) with the back part of the electrode holder body (1) through the force it exerts on the spring base (22).

In order for the bare end of the welding cable to be connected in the hole (19) of the electrode holder body (1) by the screws (20), the insulating head (15) has to be removed too, unscrewing the screw (16). On the other hand, its removal may not be necessary, if the insulating head (15) has a longitudinal opening above the screws (20) and this longitudinal opening is covered by a projection of the handle (25). Thus, when the handle (25) with the projection is removed the screws (20) are revealed.

The welding cable is inserted into the longitudinal through hole (29) of the handle (25), said handle (25) having been removed as described above, and then the bare end of the welding cable is led into the hole (19) and is fixed in it by the screws (20). Then, if the insulating head has been removed, it is placed into position at the front part of the electrode holder and it is fixed on the electrode holder body by the screw (16).

In order for the handle (25) to be assembled with the electrode holder body (1), the back part of the electrode holder body (1) is pressed to enter like a drawer into the separate receptacle (24) of the handle (25). The protrusion (23) of the spring base (22) is forced to ascent and to slide on the longitudinal protrusion (26) and finally to enter and to be encaged into the recess (27).

The longitudinal opening (28), at the top of the seperated receptacle (24), is surrounded by a wall (30) of the handle (25). The space between the two sides of the wall (30) is bigger than the width of the lever arm (7) so that the lever can be moved freely, when the lever arm (7) is pressed downwards by the palm of the welder in order for a welding electrode to be placed onto one positioning seat of electrodes (12).

The distance travelled by the welding current, from the welding cable connection position in the hole (19) up to the positioning seats of electrodes (12), is shorter than that distance, if the cable connection position was located at the rear end of the electrode holder body and inside the handle, i.e. as it is in the known welding electrode holders. The shorter distance travelled by the welding current results in lower heat generation.

Furthermore, the weight of the electrode holder is smaller than that weight, if the electrode holder body was extended in the handle and the welding cable connection position was located inside the handle, due to the smaller size of the electrode holder body and due to its shorter length in particular.

The heat generation, due to the welding current travel from the welding cable connection position in the hole (19) to a welding electrode placed onto a positioning seat of electrodes (12), is taking place in the front and in the middle part of the electrode holder body (1) which are located inside the insulating head (15) and outside the handle (25). The transfer of the welding cable connection position outside the handle (25) keeps the heat generating parts of the electrode holder away from the handle (25). Therefore, the temperature on the external surface of the handle (25) held by the welder is reduced in relation to the temperature which would be developed, if the welding cable connection position was located inside the handle, as in the known welding electrode holders.

Heat is not generated in the back part of the electrode holder body (1), i.e. in the small part of the electrode holder body (1) which has been inserted into the separate receptacle (24), because it is not in the path of the welding current. Nevertheless, part of the heat generated in the rest part of the electrode holder body (1) due to the passing of the welding current is transferred to the back part of the electrode holder body (1).

The back part of the electrode holder body (1) has recesses (32) on its sides which come in contact with the sides of the separate receptacle (24) in order for the contact surface between the electrode holder body (1) and the separate receptacle (24) to be reduced and consequently the heat transfer from the sides of the electrode holder body (1) to the handle (25) to be reduced too.

The lever arm (7) intervenes between the hand of the welder and the top of the separate receptacle (24). The middle and in particular the back part of the lever arm (7), which come into contact with the palm of the welder when he/she presses the lever arm (7) in order to put an electrode in the electrode holder, are kept at low temperature, because these parts are made of electrically—thermally insulating material only, without containing the back part of the metallic lever (5) which is at high temperature.

The longitudinal through hole (29) of the handle (25) intervenes between the hand of the welder and the bottom of the separate receptacle (24). Therefore, the temperature at the downward part of the external surface of the handle (25) held by the welder is lower in relation to the temperature which would be developed, if the electrode holder body (1) was seated directly on the internal surface of the handle (25), i.e. on the internal wall of the longitudinal through hole (29).

The wall (30) of the handle (25) does not allow the hand of the welder to reach very close to the back of the separate receptacle (24). Furthermore, the separate receptacle (24) has a recess (31) at its back, so that the contact area with the electrode holder body (1) to be reduced and consequently the heat transfer to the handle (25) to be reduced too.

The metallic lever (5) as well as the front part of the electrode holder body (1) with the positioning seats of electrodes (12) can also have a different shape than that one shown in the FIGS. 1, 2 and 3 so that jaws to be formed (crocodile type). In such a shape, instead of one solid insulating head (15) there are two separate insulating covers. The first insulating cover protects the downward surface and the sides at the front and at the middle part of the electrode holder body and it is fixed on the electrode holder body by a screw. The second insulating cover protects the top surface and the sides of the metallic lever and it is fixed on the metallic lever by a screw.

The welding electrode holder, according to the first way of materialization of the invention described above, requires the removal of the handle in order for the welding cable to be connected in the electrode holder body. The removal of the handle for the connection of the welding cable in the electrode holder body is the usual procedure followed by the known welding electrode holders too.

A welding electrode holder is known from the Dutch patent 144852, May 1965 and from the corresponding West German patent 1 300 420, July 1969 characterized in that the electrode holder body has a cavity with a through slot at its bottom, into which said cavity it has been placed a component made of insulating material, on which said component it is seated the compression spring of the electrode holder, and a protruding section of the said component is passing through the slot of the cavity and is seated stably into a cavity or a hole on the internal wall of a tubular handle by the force of the spring, holding by that way assembled together the electrode holder body with the tubular handle.

The above way of assemblage between the handle and the electrode holder body is also applied in the first way of materialization of the present invention but modified in that the recess (27) (cavity), into which the protrusion (23) of the spring base (22) is inserted, is located in the seperated receptacle (24) of the handle (25), above the longitudinal through hole (29) of the handle (25) and not on the internal wall of the handle, inside the longitudinal through hole of the handle, as in the above mentioned patents.

The intervention of the longitudinal through hole (29) between the separate receptacle (24), where the back part of the electrode holder body (1) is seated, and the downward part of the handle (25), keeps the external surface of the handle (25) and its downward part in particular at lower temperature in relation to the temperature developed at the same area, if part of die electrode holder body is seated directly on the internal wall of the handle, as in the above mentioned patents.

The description is continued by presenting the second way of materialization of the invention.

Referring to the FIGS. 5, 6, 7 and 8, the welding electrode holder comprises an electrically conducting electrode holder body (1B) made of a copper alloy. The electrode holder body (1) has a longitudinal channel (2B) spanning from the front to the back part of the electrode holder body (1B).

At the front part of the electrode holder body (1B) there are positioning seats of electrodes (3B) The positioning seats of electrodes (3B) are formed by the front part of the the longitudinal channel (2B) and by the two electrode insertion openings (4B), one opening at each side of the electrode holder body (1B). The front part of the longitudinal channel (2B) terminates to an open end (5B) for insertion of electrodes, said open end (5B) being at the same height with the electrode insertion openings (4B).

The electrode holder body (1B) has a longitudinal hole (6B) for the insertion of the bare end of the welding cable, located underneath the area of the positioning seats of electrodes (3B). At the downward part of the wall of the longitudinal hold (6B) there are two screws (7B) or one screw (7B) directed inside the hole (6B). The hole (6B) and the screw(s) (7B) form the welding cable connection position in the electrode holder body (1B).

The back part of the electrode holder body (1B) has been inserted like a drawer and it has been encaged in a separate receptacle (8B) located at the front part of the handle (9B) and above the longitudinal through hole of the handle (9B).

A flat metallic lever (10B) is placed in the longitudinal channel (2B), said metallic lever (10B) spanning from the front to the back part of the electrode holder body (1B) and coming out of a longitudinal opening at the top side of the separate receptacle (8B).

One pin (11B) has been entered into a transverse through hole on both sides of the separate receptacle (8B) of the handle (9B), into a transverse through hole on both sides of the back part of the electrode holder body (1B) and into a transverse through hole on the metallic lever (10B). Therefore, the pin (11B) holds assembled to each other the handle (9B), the electrode holder body (1B) and the metallic lever (10B). The only allowable movement is the pivoting of the metallic lever (10B) with pivoting axis the pin (11B).

The back part of the metallic lever (10B) is solidly encased in electrically—thermally insulating material, e.g. bakelite, from which said material it is made the lever arm (12B). The connection of the metallic lever (10B) with the lever arm (12B) is achieved by the protrusions (13B) and (14B) at the back part of the metallic lever (10B), said protrusions being solidly encased in the electrically—thermally insulating material. The metallic lever (10B) and the lever arm (12B) form a single component which is the lever of the welding electrode holder.

The lever arm (12B) has a hole (15B) on the bottom of which hole (15B) it is seated the one end of a compression spring (16B). The other end of the compression spring (16B) is seated on the bottom of a hole (17B) on the handle (9B) of the electrode holder, opposite the hole (15B) of the lever arm (12B). The compression spring (16B) is always under compression between the bottom of the hole (15B) and the bottom of the hole (17B).

The front part of the metallic lever (10B) is terminating at the front part of the electrode holder body (1B) onto the positioning seats of electrodes (3B). In order for an electrode to be placed onto a positioning seat of electrodes, force is exerted vertically on the back part of the lever arm (12B) by the palm of the welder. The lever is pivoting, with pivoting axis the pin (11B), further compressing (closing) the compression spring (16B) and the front part of the metallic lever (10B) is lifted from the positioning seats of electrodes (3B).

The welder places an electrode on a positioning seat of electrodes (3B) and then he/she stops exerting force on the back part of the lever arm (12B). The lever is forced to pivot and the front part of the metallic lever (10B) presses the electrode onto the positioning seat of electrodes (3B), due to the force exerted on the lever arm (12B) by the compressed spring (16B).

At the front part of the handle (9B) and opposite to the bottom of the separate receptacle (8B) there is a transverse opening (18B) which reveals part of the longitudinal through hole of the handle (9B).

In the front part of the handle (9B) the diameter of its longitudinal though hole is gradually reduced and it ends down to the same size as that of the diameter of the hole (6B). This end of the longitudinal through hole of the handle (9B) is exactly opposite to the hole (6B) in which the welding cable is connected to the electrode holder body.

The whole electrode holder body (1B), the part of the metallic lever (10B) not encased in the electrically—thermally insulating material of the lever arm (12B), and the front part of the handle (9B), with both the separate receptacle (8B) and the transverse opening (18B), are covered by an insulating head (19B) made of electrically—thermally insulating material, e.g. bakelite. The insulating head (19B) is fixed on the electrode holder body (1B) by a screw (20B).

The insulating head (19B) has two side openings facing the two electrode insertion openings (4B) and one electrode insertion hole (21B), said hole (21B) being at the same height with the open end (5B) at the electrode holder body (1B). Furthermore, the insulating head (19B) has a recess (22B) into which the lover of the electrode holder can move freely during its pivoting.

In order for the bare end of the welding cable to be connected to the electrode holder body (1B) in the hole (6B), the insulating head (19B) has to be removed, unscrewing the screw (20B).

The welding cable is inserted from the back end of the the longitudinal through hole of the handle (9B) and it is led into the hole (6B) of the electrode holder body (1B) by the converging section of the longitudinal through hole of the handle (9B).

The transverse opening (18B) at the front part of the handle (9B) allows the visual contact with the welding cable and also allows any possible assistance needed for the bare end the welding cable to be inserted into the hole (6B).

The welding cable is fixed in the hole (6B) of the electrode holder body (1B) by the screw (7B). Then the insulating head (19B) is put in place and it is fixed on the electrode holder body (1B) by the screw (20B).

The distance travelled by the welding current, from the welding cable connection position in the hole (6B) up to the positioning seats of electrodes (3B), is extremely shorter than that distance, if the welding cable connection position was located at the rear end of the electrode holder body and inside the handle, i.e. as it is in the known electrode holders. Moreover, the distance travelled by the welding current is much shorter even than the already short distance travelled by the welding current in the electrode holder body, according to the first way of materialization of the present invention described above.

The extremely shorter distance travelled by the welding current in the electrode holder body (1B) results in considerably reduced heat generation. Furthermore, the weight of the electrode holder is considerably reduced, due to the very small size (length) of the electrode holder body (1B).

The transfer of the welding cable connection position outside the handle (9B) keeps the front part of the electrode holder body (1B), where the heat is generated, away from the handle (9B). Therefore, the temperature on the external surface of the handle held by the welder, i.e. behind the insulating head, is reduced in relation to the temperature which would be developed, if the cable connection position was located inside the handle, as in the known welding electrode holders.

Furthermore, the front part of the handle (9B), containing the separate receptacle (8B) in which the back part of the electrode holder body (1B) is fixed, is extended inside the insulating head (19B) and therefore, the hand of the welder is also kept away from any point of the contact area between the electrode holder body (1B) and the handle (9B).

Consequently, the external surface of the handle (9B) hold by the welder, i.e. behind the insulating head (19B), is kept further away from the electrode holder body (1B) and does not contain any part of the electrode holder body (1B), thus being kept at even lower temperature to that one if it contained the back part of the electrode holder body, as in the first way of materialization of the present invention.

The middle and in particular the back part of the lever arm (12B), which come into contact with the palm of the welder when he/she presses the lever arm (12B) in order to put an electrode in the electrode holder, are kept at low temperature, because these parts are made of electrically— thermally insulating material only, without containing the back part of the metallic lever (10B) which is at high temperature.

A result of the reduced heat generation in the electrode holder body (1B), of the increased distance between the hand and the hot metal parts of the electrode holder, i.e. the electrode holder body (1B) and the metallic lever (10B), as well as of the construction of both the handle (9B) and the lever arm (12B) by electrically—thermally insulating material, is the low temperature on the external surface of the handle (9B) held by the welder, i.e. behind the insulating head (19B).

The welding electrode holder, according to this second way of materialization of the present invention, requires the removal of the insulating head (19B) only, in order for the bare end of the welding cable to be connected in the electrode holder body (1B). The removal of the insulating head (19B) only, for the connection of the welding cable, is not the usual procedure followed by the known welding electrode holders. The usual procedure is the removal of the handle.

The metallic lever (10B) as well as the front part of the electrode holder body (1B) with the positioning seats of electrodes (3B) can also have a different shape than that one shown in the FIGS. 5, 6 and 7, so that jaws to be formed (crocodile type). In such a shape, instead of one solid insulating head (19B) there are two separate insulating covers. The first insulating cover protects the downward surface and the sides of the electrode holder body as well as the the front part of the handle (9B) with the transverse opening (18B), and it is fixed on the electrode holder body by a screw. The second insulating cover protects the top surface and the sides of the metallic lever as well as the front part of the handle (9B) with the separate receptacle (8B) containing the back part of the electrode holder body, and it is fixed on the electrode holder body by a screw.

What is claimed is:

1. Welding electrode holder for coated electrodes comprising an electrically conducting electrode holder body with positioning seats of electrodes and welding cable connection position, an electrically and thermally insulating handle of tubular shape where the back part of the electrode holder body is encaged, a lever pivotably assembled with the electrode holder body and having the lever arm electrically—thermally insulated, a compression spring seated on the electrode holder body or on the handle and pushing the lever arm thus forcing the lever to be turned and to exert force onto the positioning seats of electrodes, and an electrically—thermally insulating head covering the parts of the electrode holder body and those of the lever located in front of the handle or even covering and part of the handle and allowing the clamping of electrodes onto the electrode holder body, said welding electrode holder for coated electrodes characterized in that the welding cable connection position in the electrode holder body is located outside the handle and inside the insulating head, behind and/or underneath the positioning seats of electrodes, and in that the rest electrode holder body, i.e. behind the welding cable connection position, is encaged in a separate receptacle located at the front part of the handle, above the longitudinal through hole of the handle and outside or inside the insulating head.

2. A welding electrode holder for coated electrodes according to the claim 1, characterized in that, according to a first way of materialization of the invention, the welding cable connection position (19, 20) in the electrode holder body (1) is located outside the handle (25) and inside the insulating head (15), behind the positioning seats of electrodes (12), and in that the rest electrode holder body (1), i.e. behind the welding cable connection position (19, 20), is encaged in a separate receptacle (24) located at the front part of the handle (25), above the longitudinal through hole of the handle (25) and outside the insulating head (15) and in order for the welding cable to be connected in the electrode holder body (1) it is required the handle (25) to be removed.

3. A welding electrode holder for coated electrodes according to the claims 2, characterized in that the compression spring (11) is seated on the electrode holder body (1) through a solid spring base (22) made of electrically— thermally insulating material, said spring base (22) having been placed on the back part of the electrode holder body (1) in a cavity (21) with a through slot (4) at its bottom, through which passes the protrusion (23) of the spring base (22) and terminates in a recess (27) at the bottom of the separate receptacle (24), thus holding assembled together by the force of the spring (11) the electrode holder body (1) with the handle (25) above the longitudinal through hole (29) of the handle (25) and inside the separate receptacle (24), where the back part of the electrode holder body (1) has been inserted like a drawer, and also allowing their disassemlage by the exertion of adequate tensional force between them, which forces the protrusion (23) of the solid spring base (22) to ascent and to come out of the recess (27), overcoming the vertical force of the spring (11) and disengaging the electrode holder body (1) from the handle (25).

4. A welding electrode holder for coated electrodes according to the claim 1, characterized in that, according to a second way of materialization of the invention, the welding cable connection position (6B, 7B) in the electrode holder body (1B) is located outside the handle (9B) and inside the insulating head (19B), underneath the positioning seats of electrodes (3B), and in that the rest electrode holder body (1B), i.e. behind the welding cable connection position (6B, 7B), is encaged in a separate receptacle (8B) located at the front part of the handle (9B), above the longitudinal through hole of the handle (9B), which said front part of the handle (9B) with the separate receptacle (8B) is extended inside the insulating head (19B) and the whole electrode holder body (1B) is covered by the insulating head (19B).

5. A welding electrode holder for coated electrodes according to the claims 4, characterized in that the compression spring (16B) is not seated on the electrode holder body (1B) but it is seated in a hole (17B) of the handle (9B) and the back part of the electrode holder body (1B) has been entered like a drawer in a separate receptacle (8B) located at the front part of the handle (9B) where it is held in position stably, without any possibility to move, by the pin (11B), which said pin (11B) has been inserted into a transverse through hole on both sides of the separate receptacle (8B), into a transverse through hole on both sides of the back part of the electrode holder body (1B), and into a transverse through hole on the metallic lever (10B) and allows only the pivoting of the metallic lever (10B) with pivoting axis the pin (11B).

6. A welding electrode holder for coated electrodes according to the claims 5, characterized in that in order for the welding cable to be connected in the electrode holder body (1B) it is required the removal of the insulating head (19B) only and it is not required the removal of the handle (9B).

* * * * *